United States Patent
Shi et al.

(10) Patent No.: US 10,497,975 B2
(45) Date of Patent: Dec. 3, 2019

(54) LITHIUM ION BATTERY NON-AQUEOUS ELECTROLYTE AND LITHIUM ION BATTERY

(71) Applicant: SHENZHEN CAPCHEM TECHNOLOGY CO., LTD, Shenzhen (CN)

(72) Inventors: Qiao Shi, Shenzhen (CN); Shiguang Hu, Shenzhen (CN); Qun Chen, Shenzhen (CN); Qi Huang, Shenzhen (CN); Xue Zhou, Shenzhen (CN)

(73) Assignee: SHENZHEN CAPCHEM TECHNOLOGY CO., LTD., Shenzhen, Guangdong (CN)

( * ) Notice: Subject to any disclaimer, the term of this patent is extended or adjusted under 35 U.S.C. 154(b) by 173 days.

(21) Appl. No.: 15/558,551

(22) PCT Filed: Nov. 24, 2015

(86) PCT No.: PCT/CN2015/095386
§ 371 (c)(1),
(2) Date: Sep. 14, 2017

(87) PCT Pub. No.: WO2017/075851
PCT Pub. Date: May 11, 2017

(65) Prior Publication Data
US 2018/0062203 A1    Mar. 1, 2018

(30) Foreign Application Priority Data

Nov. 4, 2015 (CN) .......................... 2015 1 0742728

(51) Int. Cl.
| | | |
|---|---|---|
| *H01M 4/131* | (2010.01) | |
| *H01M 10/0567* | (2010.01) | |
| *H01M 10/0525* | (2010.01) | |
| *H01M 4/13* | (2010.01) | |
| *H01M 10/0568* | (2010.01) | |
| *H01M 10/0569* | (2010.01) | |
| *H01M 4/133* | (2010.01) | |

(52) U.S. Cl.
CPC ....... *H01M 10/0567* (2013.01); *H01M 4/131* (2013.01); *H01M 10/0525* (2013.01); *H01M 10/0568* (2013.01); *H01M 10/0569* (2013.01); *H01M 4/133* (2013.01); *H01M 2220/20* (2013.01); *H01M 2300/004* (2013.01)

(58) Field of Classification Search
CPC .. H01M 4/131; H01M 4/133; H01M 10/0567; H01M 10/0525; H01M 10/0569
See application file for complete search history.

(56) References Cited

U.S. PATENT DOCUMENTS

| | | | |
|---|---|---|---|
| 6,511,772 B2 * | 1/2003 | Gan | ........................ H01M 4/13 429/212 |
| 6,919,141 B2 | 7/2005 | Gan et al. | |
| 2002/0094479 A1 * | 7/2002 | Gan | ........................ H01M 4/13 429/212 |
| 2003/0113635 A1 * | 6/2003 | Gan | ...................... H01M 4/485 429/326 |
| 2009/0176164 A1 | 7/2009 | Matsui et al. | |

(Continued)

FOREIGN PATENT DOCUMENTS

| | | |
|---|---|---|
| CN | 1558464 | 12/2004 |
| CN | 1866605 A | 11/2006 |

(Continued)

OTHER PUBLICATIONS

U.S. Appl. No. 15/557,780, Shi et al., filed Sep. 12, 2017.

(Continued)

*Primary Examiner* — Kenneth J Douyette
(74) *Attorney, Agent, or Firm* — Ladas & Parry, LLP

(57) ABSTRACT

Disclosed is a lithium ion battery non-aqueous electrolyte and a lithium ion battery, in which the electrolyte comprises: a non-aqueous organic solvent, a lithium salt and an additive, said additive comprises: a compound represented by the structural formula 1 and a compound represented by the structural formula 2, in which R is an alkyl selected from an alkyl group having 1 to 4 carbon atoms, the ratio of the content of the compound represented by the structural formula 1 to the total mass of the lithium ion battery non-aqueous electrolyte is 0.1% to 2%, and the ratio of the content of the compound represented by the structural formula 2 to the total mass of the lithium ion battery non-aqueous electrolyte is less than 0.5%.

9 Claims, No Drawings

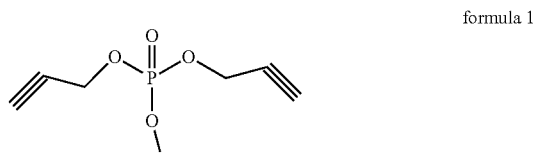

formula 1

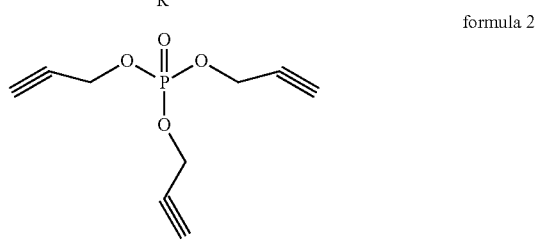

formula 2

(56) References Cited

U.S. PATENT DOCUMENTS

| | | |
|---|---|---|
| 2009/0181301 A1 | 7/2009 | Kim et al. |
| 2010/0255369 A1 | 10/2010 | Hwang et al. |
| 2012/0018077 A1 | 1/2012 | Lee et al. |
| 2012/0034533 A1 | 2/2012 | Hong et al. |
| 2012/0100436 A1 | 4/2012 | Inou et al. |
| 2012/0107700 A1 | 5/2012 | Deguchi |
| 2013/0122378 A1 | 5/2013 | Oh et al. |
| 2013/0183579 A1 | 7/2013 | Kim et al. |
| 2013/0323605 A1 | 12/2013 | Yamamoto et al. |

FOREIGN PATENT DOCUMENTS

| | | |
|---|---|---|
| CN | 101385183 A | 3/2009 |
| CN | 101440105 | 5/2009 |
| CN | 101517678 A | 8/2009 |
| CN | 100585935 C | 1/2010 |
| CN | 101882696 | 11/2010 |
| CN | 102150315 A | 8/2011 |
| CN | 102450315 | 8/2011 |
| CN | 102280664 | 12/2011 |
| CN | 102332607 A | 1/2012 |
| CN | 102394311 A | 3/2012 |
| CN | 102460817 A | 5/2012 |
| CN | 102473962 A | 5/2012 |
| CN | 102983353 | 3/2013 |
| CN | 103107360 A | 5/2013 |
| CN | 103151559 A | 6/2013 |
| CN | 103151559 A | 6/2013 |
| CN | 103208623 A | 7/2013 |
| CN | 103339783 A | 10/2013 |
| CN | 103441304 A | 12/2013 |
| CN | 103531864 A | 1/2014 |
| CN | 103594729 A | 2/2014 |
| CN | 102439776 B | 4/2014 |
| CN | 103715454 A | 4/2014 |
| CN | 103811815 A | 5/2014 |
| CN | 104300174 A | 1/2015 |
| CN | 104466248 A | 3/2015 |
| CN | 104600361 A | 5/2015 |
| CN | 104752764 A | 7/2015 |
| EP | 1213782 A2 | 6/2002 |
| JP | 2000-348764 | 12/2000 |
| JP | 2004-165151 | 6/2004 |
| JP | 2011-124039 A | 6/2011 |
| JP | 2012-084384 A | 4/2012 |
| JP | 2015060819 A | 3/2015 |
| KR | 20070103919 A | 10/2007 |
| KR | 10-1195931 B1 | 10/2012 |

OTHER PUBLICATIONS

U.S. Appl. No. 15/557,788, Shi et al., filed Sep. 12, 2017.
U.S. Appl. No. 15/559,014, Shi et al., filed Sep. 15, 2017.
International Search Report for PCT/CN2015/091506 dated May 3, 2016, and its English translation provided by WIPO.
Written Opinion of the International Search Authority for PCT/CN2015/091506 dated May 3, 2016, and its English translation provided by Bing.Com Microsoft Translate.
From CN201510481841.3, 1$^{st}$ Office Action dated Jul. 6, 2016 with an English translation from Espacenet Global Dossier.
From CN201510481841.3, Search Report dated Jun. 28, 2016.
From CN201510964662.5, 1st Office Action dated May 24, 2017 with an English translation from Espacenet Global Dossier.
From CN201510964662.5, Search Report dated May 12, 2017.
From CN201310624603.4, First Office Action dated Mar. 31, 2015 with an English translation from Espacenet Global Dossier.
From CN201310624603.4, Search Report dated Mar. 23, 2015.
From CN201410534841.0, First Office Action dated Feb. 25, 2016 with an English translation from Espacenet Global Dossier.
From CN201410534841.0, Second Office Action dated Sep. 2, 2016 with an English translation from Espacenet Global Dossier.
From CN20141534841.0, Third Office Action dated Mar. 1, 2017 with an English translation from Espacenet Global Dossier.
From CN20141534841.0, Search Report dated Feb. 17, 2016.
International Search Report for PCT/CN2015/098657 dated Mar. 24, 2016, and its English translation provided by WIPO.
Written Opinion of the International Search Authority for PCT/CN2015/098657 dated Mar. 24, 2016, and its English translation provided by Bing.Com Microsoft Translate.
International Search Report for PCT/CN2015/095386 dated Apr. 13, 2016, and its English translation provided by WIPO.
Written Opinion of the International Search Authority for PCT/CN2015/095386 dated Apr. 13, 2016, and its English translation provided by Bing.Com Microsoft Translate.
From CN201510742728.6, 1$^{st}$ office action dated Jun. 2, 2017, with an English translation from Espacenet global dossier.
From CN201510742728.6, Search Report dated May 19, 2017.
From CN2013146105.6, First Office Action dated Aug. 25, 2014, with an English translation from Espacenet global dossier.
From CN2013146105.6, Second Office Action dated Feb. 10, 2015, with an English translation from Espacenet global dossier.
From CN2013146105.6, Third Office Action dated Apr. 24, 2015, with an English translation from Espacenet global dossier.
From CN2013146105.6, Supplementary search dated Feb. 2, 2015.
International Search Report for PCT/CN2015/083624 dated Sep. 11, 2015, and its English translation provided by WIPO.
Written Opinion of the International Search Authority for PCT/CN2015/083624 dated Sep. 11, 2015, and its English translation provided by Bing.Com Microsoft Translate.
"Electronegativity-induced enhancement of thermal stability by succinonitrile as an additive for Li ion batteries", Energy & Environmental Science, 2011, 4, 4038-4045.
"Surface Complex Formation between Aliphatic Nitrile Molecules and Transition Metal Atoms for Thermally Stable Lithium-Ion Batteries", Applied Materials & Interfaces, 2014, 6, 8913-8920.

* cited by examiner

LITHIUM ION BATTERY NON-AQUEOUS ELECTROLYTE AND LITHIUM ION BATTERY

CROSS REFERENCE TO RELATED APPLICATIONS

The present application is the U.S. national Phase of PCT Application No. PCT/CN2015/095386 filed on Nov. 24, 2015, which claims priority to Chinese Patent Application No. 201510472728.6 filed on Nov. 4, 2015, the disclosures of which are incorporated herein by reference in their entireties.

TECHNICAL FIELD

The present invention relates to the field of lithium ion battery electrolyte technology, and in particular to a lithium ion battery non-aqueous electrolyte and a lithium ion battery.

BACKGROUND OF THE INVENTION

At present, a non-aqueous electrolyte lithium ion battery has been increasingly more widely used in a 3 C consumer electronic product market, and with the development of new energy vehicles, the non-aqueous electrolyte lithium ion battery has been increasingly more popularized as a power source system of vehicles. These non-aqueous electrolyte batteries have been practical, but are still dissatisfactory in the aspect of durability, and especially have short service lives at a high temperature of 45° C. Especially for powered vehicles and energy storage systems, the non-aqueous electrolyte lithium ion battery is requested to work properly in a cold region, so that even more considerations shall be given to high- and low-temperature performances.

In the non-aqueous electrolyte lithium ion battery, the non-aqueous electrolyte is a key factor affecting the high- and low-temperature performances of the battery. In particular, the additive in the non-aqueous electrolyte is especially important for giving play to the high- and low-temperature performances of the battery. At present, the practical non-aqueous electrolyte uses a traditional film forming additive, e.g. vinylene carbonate (VC), to ensure the excellent cycle performance of the battery. But due to poor high voltage stability, VC can hardly meet the requirements for cycle performance at 45° C. under the conditions of high voltage and high temperature.

The patent document U.S. Pat. No. 6,919,141B2 discloses a phosphate additive for non-aqueous electrolyte containing an unsaturated bond, which can reduce the irreversible capacity of lithium ion batteries and improve the cycle performance of lithium batteries. Similarly, the patent document 201410534841.0 also discloses a novel phosphate compound film forming additive containing a triple bond, which can not only improve the high temperature cycle performance, but also significantly improve the storage performance. But persons skilled in the art found in their researches that a passive film formed by the phosphate additive containing the triple bond on an electrode interface has poor conductivity, resulting in a high interface impedance, significantly degrading the low-temperature performance, and inhibiting the application of the non-aqueous lithium ion battery under low-temperature conditions.

SUMMARY OF THE INVENTION

The present invention provides a lithium ion battery non-aqueous electrolyte capable of giving consideration to high- and low-temperature performances of the battery, and further provides a lithium ion battery containing the lithium ion battery non-aqueous electrolyte.

According to a first aspect of the present invention, the present invention provides a lithium ion battery non-aqueous electrolyte, including a non-aqueous organic solvent, a lithium salt and an additive, wherein the additive comprises: a compound represented by the structural formula 1 and a compound represented by the structural formula 2, in which R is an alkyl selected from an alkyl group having 1 to 4 carbon atoms,

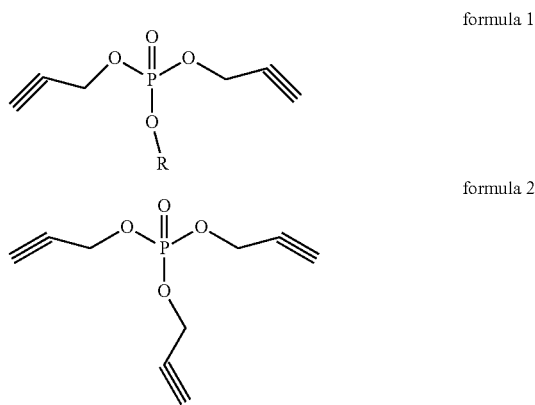

the ratio of the content of the compound represented by the structural formula 1 to the total mass of the lithium ion battery non-aqueous electrolyte is 0.1% to 2%, and the ratio of the content of the compound represented by the structural formula 2 to the total mass of the lithium ion battery non-aqueous electrolyte is less than 0.5%.

As a preferable solution of the present invention, R in the compound represented by the structural formula 1 is selected from the group consisting of a methyl group, an ethyl group, a propyl group, an isopropyl group, a butyl group, an isobutyl group, a sec-butyl group and a tert-butyl group.

As a further improved solution of the present invention, the non-aqueous organic solvent is a mixture of a cyclic carbonate of one or more than two selected from ethylene carbonate, propylene carbonate and butylene carbonate and an acyclic carbonate of one or more than two selected from dimethyl carbonate, diethyl carbonate, ethyl methyl carbonate and methyl propyl carbonate.

As a further improved solution of the present invention, the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

As a further improved solution of the present invention, the additive further comprises one or more than two of vinylene carbonate, fluoroethylene carbonate and vinyl ethylene carbonate.

As a second aspect of the present invention, the present invention provides a lithium ion battery, comprising a positive electrode, a negative electrode and a diaphragm between the positive electrode and the negative electrode, and further comprising the lithium ion battery non-aqueous electrolyte according to the first aspect.

As a further improved solution of the present invention, the positive electrode is one or more than two selected from $LiCoO_2$, $LiNiO_2$, $LiMn_2O_4$, $LiCo_{1-y}M_yO_2$, $LiNi_{1-y}M_yO_2$, $LiMn_{2-y}M_yO_4$ and $LiNi_xCo_yMn_zM_{1-x-y-z}O_2$, M is one or more than two selected from Fe, Co, Ni, Mn, Mg, Cu, Zn, Al, Sn, B, Ga, Cr, Sr, V and Ti, and $0 \le y \le 1$, $0 \le x \le 1$, $0 \le z \le 1$, $x+y+z \le 1$.

As a further improved solution of the present invention, a charge cut-off voltage of the lithium ion battery is more than or equal to 4.35 V.

The lithium ion battery non-aqueous electrolyte according to the present invention contains a compound as shown in the structural formula 1, which can decompose at the positive electrode and the negative electrode to form a passive film capable of inhibiting direct contact between active substances and the non-aqueous electrolyte to prevent decomposition of the active substances, thereby improving the performance of the battery; under the circumstance, if the compound as shown in the structural formula 1 coexists with a compound represented by the structural formula 2, they can also decompose on the surface of the positive electrode and the negative electrode to form a passive film, thereby forming a passive film by compounding decomposers of the compound represented by the structural formula 1 and the compound represented by the structural formula 2, and showing a feature of giving considerations to high- and low-temperature performances failing to be achieved when each additive separately exists.

DETAILED DESCRIPTION OF THE INVENTION

The present invention will be further described in detail below in conjunction with embodiments.

An embodiment of the present invention provides a lithium ion battery non-aqueous electrolyte, including a non-aqueous organic solvent, a lithium salt and an additive, wherein the additive comprises: a compound represented by the structural formula 1 and a compound represented by the structural formula 2, in which R is an alkyl selected from an alkyl group having 1 to 4 carbon atoms,

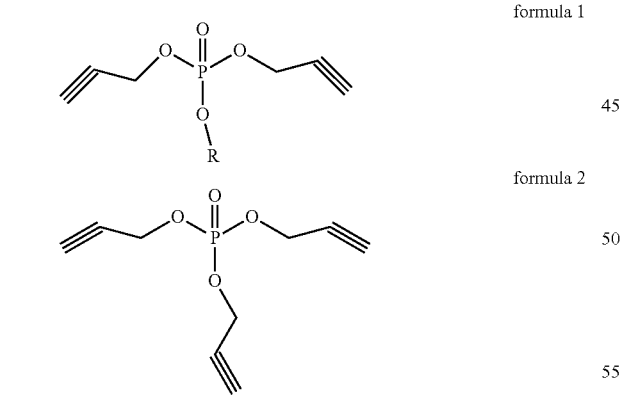

the ratio of the content of the compound represented by the structural formula 1 to the total mass of the lithium ion battery non-aqueous electrolyte is 0.1% to 2%, and the ratio of the content of the compound represented by the structural formula 2 to the total mass of the lithium ion battery non-aqueous electrolyte is less than 0.5%.

An exemplary compound in the compound represented by the structural formula 1 is shown in Table 1, but is not limited thereto. The compound represented by the structural formula 2 is tripropargyl phosphate.

TABLE 1

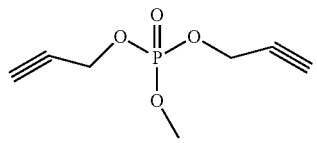

Compound 1

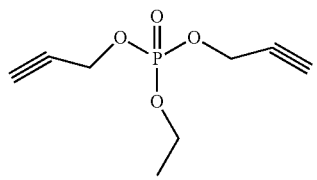

Compound 2

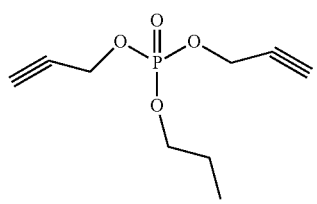

Compound 3

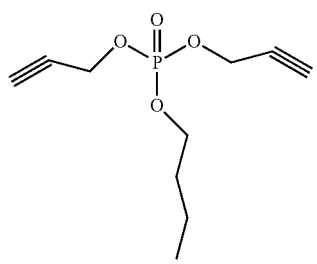

Compound 4

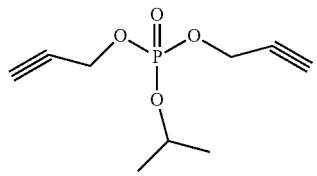

Compound 5

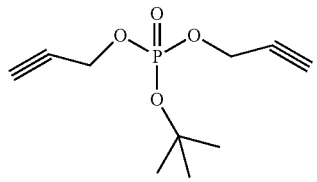

Compound 6

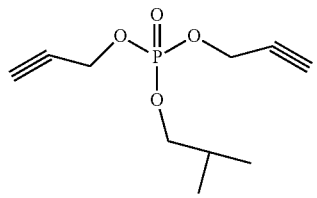

Compound 7

Compound 8

TABLE 1-continued

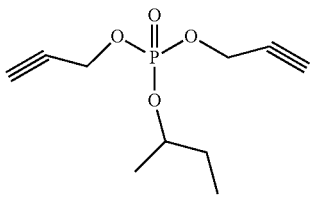

In a preferable embodiment of the present invention, the ratio of the content of the compound represented by the structural formula 1 to the total mass of the lithium ion battery non-aqueous electrolyte is 0.1% to 2%. When the ratio is below 0.1%, it is difficult to fully form passive films on the surfaces of the positive electrode and the negative electrode, so that it is difficult to fully improve the high-temperature storage performance of the non-aqueous electrolyte battery. When the ratio is more than 2%, the compound represented by the structural formula 1 forms very thick passive films on the surfaces of the positive electrode and the negative electrode, thereby increasing the internal resistance of the battery and reducing the low-temperature performance of the battery. The ratio of the content of the compound represented by the structural formula 2 to the total mass of the lithium ion battery non-aqueous electrolyte is less than 0.5%. When the content of the compound represented by the structural formula 2 is more than 0.5%, the internal resistance of the battery is very high, thereby reducing the low-temperature performance of the battery.

In the electrolyte for the non-aqueous electrolyte lithium ion battery according to the present invention, the high-temperature storage feature and the low-temperature feature of the battery are significantly improved by using both the compound represented by the structural formula 1 and the compound represented by the structural formula 2, compared with separate addition of the respective compounds. The action mechanism is unknown, but any additive forms a passive film on the surfaces of the positive electrode and the negative electrode to inhibit redox decomposition of the electrolyte for the non-aqueous electrolyte lithium ion battery, thereby improving the battery performance. Furthermore, it is inferred that when two additives are used together, a composite passive film formed by the two additives is more stable through an interaction (e.g. synergistic effect), so that it is easy to conduct lithium ions even at a low temperature.

In a preferable embodiment of the present invention, the non-aqueous organic solvent is a mixture of a cyclic carbonate of one or more than two selected from ethylene carbonate, propylene carbonate and butylene carbonate and an acyclic carbonate of one or more than two selected from dimethyl carbonate, diethyl carbonate, ethyl methyl carbonate and methyl propyl carbonate.

A mixed liquid of the cyclic carbonate organic solvent having a high dielectric constant and the acyclic carbonate organic solvent having a low viscosity is used as a solvent of the lithium ion battery electrolyte, so that the mixed liquid of the organic solvents has a high ionic conductivity, a high dielectric constant and a low viscosity.

In a preferable embodiment of the present invention, the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$, preferably $LiPF_6$ or a mixture of $LiPF_6$ and other lithium salts.

In a preferable embodiment of the present invention, the additive further comprises one or more than two of vinylene carbonate (VC), fluoroethylene carbonate (FEC) and vinyl ethylene carbonate (VEC).

The film forming additive can form a more stable SEI film on the surface of a graphite negative electrode, thus significantly improving the cycle performance of the lithium ion battery.

An embodiment of the present invention provides a lithium ion battery, comprising a positive electrode, a negative electrode and a diaphragm between the positive electrode and the negative electrode, and further comprising the lithium ion battery non-aqueous electrolyte according to the first aspect.

In a preferable embodiment of the present invention, the positive electrode is one or more than two selected from $LiCoO_2$, $LiNiO_2$, $LiMn_2O_4$, $LiCo_{1-y}M_yO_2$, $LiNi_{1-y}M_yO_2$, $LiMn_{2-y}M_yO_4$ and $LiNi_xCo_yMn_zM_{1-x-y-z}O_2$, M is one or more than two selected from Fe, Co, Ni, Mn, Mg, Cu, Zn, Al, Sn, B, Ga, Cr, Sr, V and Ti, and $0 \le y \le 1$, $0 \le x \le 1$, $0 \le z \le 1$, $x+y+z \le 1$.

In a preferable embodiment of the present invention, a charge cut-off voltage of the lithium ion battery is more than or equal to 4.35 V.

In an example of the present invention, a positive electrode material is $LiNi_{0.5}Co_{0.2}Mn_{0.3}O_2$, a negative electrode material is artificial graphite, and the charge cutoff voltage of the lithium ion battery is equal to 4.35 V.

The present invention will be described in detail below in conjunction with examples. It should be understood that these examples are only illustrative, but do not limit the protection scope of the present invention.

EXAMPLE 1

1) Preparation of an Electrolyte

Ethylene carbonate (EC), diethyl carbonate (DEC) and ethyl methyl carbonate (EMC) were mixed at a mass ratio of EC:DEC:EMC=1:1:1, then lithium hexafluorophosphate ($LiPF_6$) was added until a molar concentration was 1 mol/L, and then 0.1% compound 1 of the total mass of the electrolyte and 0.005% tripropargyl phosphate represented by the structural formula 2 of the total mass of the electrolyte were added, wherein compound 1, compound 2 . . . involved in the examples refer to compounds with corresponding numbers listed in Table 1 (similarly hereinafter).

2) Preparation of a Positive Plate

A positive electrode active material lithium cobalt nickel manganese oxide $LiNi_{0.5}Co_{0.2}Mn_{0.3}O_2$, a conductive carbon black Super-P and a binder polyvinylidene fluoride (PVDF) were mixed at a mass ratio of 93:4:3, and then dispersed in N-methyl-2-pyrrolidone (NMP) to obtain a positive electrode slurry. The slurry was uniformly coated on both sides of an aluminum foil, and then an aluminum lead wire was welded using an ultrasonic welder to obtain a positive plate having a thickness of 120-150 μm after drying, rolling and vacuum drying.

3) Preparation of a Negative Plate

A negative electrode active material artificial graphite, a conductive carbon black Super-P, a binder styrene-butadiene rubber (SBR) and carboxymethyl cellulose (CMC) were mixed at a mass ratio of 94:1:2.5:2.5, and then dispersed in deionized water to obtain a negative electrode slurry. The slurry was uniformly coated on both sides of a copper foil, and then a nickel lead wire was welded using an ultrasonic welder to obtain a negative plate having a thickness of 120-150 μm after drying, rolling and vacuum drying.

4) Preparation of a Cell

A polyethylene microporous membrane having a thickness of 20 μm was placed between the positive plate and the negative plate as a diaphragm, and then a sandwich structure composed of the positive plate, the negative plate and the diaphragm was wound. Then the winding body was flattened and then placed in a square aluminum metal shell, and the positive electrode lead wire and the negative electrode lead wire were respectively welded at corresponding positions of the cover plate. The cover plate and the metal shell were welded into a whole using a laser welder to obtain a cell to be filled with liquid.

5) Filling and Formation of the Cell

In a glove box having a dew point controlled below 40° C., the prepared electrolyte was injected into the cell through a liquid injection hole, and the amount of the electrolyte shall be enough to ensure that gaps of the cell are fully filled. Then formation was carried out in the following steps: charging at 0.05 C constant current for 3 min, charging at 0.2 C constant current for 5 min, charging at 0.5 C constant current for 25 min, shaping and sealing 1 hr later, further charging to 4.35 V at 0.2 C constant current, keeping at room temperature for 24 hr, and then discharging to 3.0 V at 0.2 C constant current.

6) High-temperature Cycle Performance Test

The battery was placed in a drying oven at a constant temperature of 45° C., charged to 4.35 V at 1 C constant current, charged under a constant voltage until the current was decreased to 0.1 C, and then discharged to 3.0 V at 1 C constant current, which was repeated for 300 cycles. The discharge capacity of the 1st cycle and that of the 300th cycle were recorded to calculate a capacity retention ratio of high-temperature cycles as follows:

Capacity retention ratio=discharge capacity of the 300th cycle/discharge capacity of the 1st cycle*100%

7) High-temperature Storage Performance Test

The formed battery was charged to 4.35 V at 1 C constant current under a constant voltage at room temperature, the initial discharge capacity of the battery was measured, and then the battery was discharged to 3V at 1 C after storage at 60° C. for 30 days to measure retained capacity and recovered capacity of the battery according to calculation formulae as follows:

Battery capacity retention ratio (%)=retained capacity/initial capacity×100%; and Battery capacity recovery ratio (%)=recovered capacity/initial capacity×100%.

8) Low-temperature Performance Test

At 25° C., the formed battery was charged to 4.35 V at 1 C constant current under a constant voltage, and then discharged to 3.0 V at 1 C constant current to record the discharge capacity. Then the battery was charged to 4.35 V at 1 C constant current under a constant voltage, and then discharged to 3.0 V at 0.3 C constant current after remaining in an environment at −20° C. for 12 h to record the discharge capacity.

Low-temperature discharge efficiency value at −20° C.=0.3 C discharge capacity (−20° C.)/1 C discharge capacity (25° C.)×100%.

EXAMPLE 2

As shown in Table 2, except that 0.1% compound 1 was replaced with 2% compound 2 in the preparation of an electrolyte, and 0.005% tripropargyl phosphate was replaced with 0.4% tripropargyl phosphate, other conditions were identical to those in example 1, and the measured high-temperature cycle performance, high-temperature storage performance and low-temperature performance data were shown in Table 3.

EXAMPLE 3

As shown in Table 2, except that 0.1% compound 1 was replaced with 1% compound 3 in the preparation of an electrolyte, and 0.005% tripropargyl phosphate was replaced with 0.1% tripropargyl phosphate, other conditions are identical to those in example 1, and the measured high-temperature cycle performance, high-temperature storage performance and low-temperature performance data were shown in Table 3.

EXAMPLE 4

As shown in Table 2, except that 0.1% compound 1 was replaced with 1.5% compound 4 in the preparation of an electrolyte, and 0.005% tripropargyl phosphate was replaced with 0.2% tripropargyl phosphate, other conditions were identical to those in example 1, and the measured high-temperature cycle performance, high-temperature storage performance and low-temperature performance data were shown in Table 3.

EXAMPLE 5

As shown in Table 2, except that 0.1% compound 1 was replaced with 0.5% compound 5 in the preparation of an electrolyte, and 0.005% tripropargyl phosphate was replaced with 0.05% tripropargyl phosphate, other conditions were identical to those in example 1, and the measured high-temperature cycle performance, high-temperature storage performance and low-temperature performance data were shown in Table 3.

EXAMPLE 6

As shown in Table 2, except that 0.1% compound 1 was replaced with 0.8% compound 2 in the preparation of an electrolyte, and 0.005% tripropargyl phosphate was replaced with 0.05% tripropargyl phosphate, other conditions were identical to those in example 1, and the measured high-temperature cycle performance, high-temperature storage performance and low-temperature performance data were shown in Table 3.

EXAMPLE 7

As shown in Table 2, except that 0.1% compound 1 was replaced with 0.7% compound 2 in the preparation of an electrolyte, and 0.005% tripropargyl phosphate was replaced with 0.045% tripropargyl phosphate, other conditions were identical to those in example 1, and the measured high-temperature cycle performance, high-temperature storage performance and low-temperature performance data were shown in Table 3.

EXAMPLE 8

As shown in Table 2, except that 0.1% compound 1 was replaced with 0.5% compound 2 in the preparation of an electrolyte, 0.005% tripropargyl phosphate was replaced with 0.03% tripropargyl phosphate, and 1% vinylene carbonate of the total mass of the electrolyte was added, other conditions were identical to those in example 1, and the measured high-temperature cycle performance, high-temperature storage performance and low-temperature performance data were shown in Table 3.

EXAMPLE 9

As shown in Table 2, except that 0.1% compound 1 was replaced with 0.6% compound 2 in the preparation of an electrolyte, 0.005% tripropargyl phosphate was replaced with 0.04% tripropargyl phosphate, and 2% fluoroethylene carbonate of the total mass of the electrolyte was added, other conditions were identical to those in example 1, and the measured high-temperature cycle performance, high-temperature storage performance and low-temperature performance data were shown in Table 3.

EXAMPLE 10

As shown in Table 2, except that 0.1% compound 1 was replaced with 0.7% compound 2 in the preparation of an electrolyte, 0.005% tripropargyl phosphate was replaced with 0.045% tripropargyl phosphate, and 1% vinyl ethylene carbonate of the total mass of the electrolyte was added, other conditions were identical to those in example 1, and the measured high-temperature cycle performance, high-temperature storage performance and low-temperature performance data were shown in Table 3.

COMPARATIVE EXAMPLE 1

As shown in Table 2, except that 0.1% compound 1 was replaced with 1% compound 2 in the preparation of an electrolyte, and 0.005% tripropargyl phosphate was replaced with 0.8% tripropargyl phosphate, other conditions were identical to those in example 1, and the measured high-temperature cycle performance, high-temperature storage performance and low-temperature performance data were shown in Table 3.

COMPARATIVE EXAMPLE 2

As shown in Table 2, except that 0.1% compound 1 was replaced with 1% compound 2 in the preparation of an electrolyte, and 0.005% tripropargyl phosphate was replaced with 0.55% tripropargyl phosphate, other conditions were identical to those in example 1, and the measured high-temperature cycle performance, high-temperature storage performance and low-temperature performance data were shown in Table 3.

TABLE 2

| Example | Compounds represented by structural formula 1 | | Tripropargyl phosphate | Vinylene carbonate | Fluoroethylene carbonate | Vinyl ethylene carbonate |
|---|---|---|---|---|---|---|
| Example 1 | Compound 1 | 0.1% | 0.005% | — | — | — |
| Example 2 | Compound 2 | 2% | 0.4% | — | — | — |
| Example 3 | Compound 3 | 1% | 0.1% | — | — | — |
| Example 4 | Compound 4 | 1.5% | 0.2% | — | — | — |
| Comparative example 5 | Compound 5 | 0.5% | 0.05% | — | — | — |
| Example 6 | Compound 2 | 0.8% | 0.05% | — | — | — |
| Example 7 | Compound 2 | 0.7% | 0.045% | — | — | — |
| Example 8 | Compound 2 | 0.5% | 0.03% | 1% | — | — |
| Example 9 | Compound 2 | 0.6% | 0.04% | — | 2% | — |
| Example 10 | Compound 2 | 0.7% | 0.045% | — | — | 1% |
| Comparative example 1 | Compound 2 | 1% | 0.8% | — | — | — |
| Comparative example 2 | Compound 2 | 1% | 0.55% | — | — | — |

TABLE 3

| Example | Capacity retention ratio after 300 cycles at 1 C at 45° C. | Storage at 60° C. for 30 days | | Discharge efficiency value at 0.3 C at −20° C. |
|---|---|---|---|---|
| | | Capacity retention ratio | Capacity recovery rate | |
| Example 1 | 68% | 63% | 68% | 75% |
| Example 2 | 65% | 60% | 66% | 45% |
| Example 3 | 73% | 71% | 75% | 60% |
| Example 4 | 70% | 69% | 73% | 52% |
| Example 5 | 75% | 76% | 80% | 63% |
| Example 6 | 78% | 78% | 83% | 61% |
| Example 7 | 80% | 80% | 83% | 65% |
| Example 8 | 88% | 82% | 85% | 70% |
| Example 9 | 85% | 81% | 84% | 63% |
| Example 10 | 83% | 82% | 85% | 65% |

TABLE 3-continued

| Example | Capacity retention ratio after 300 cycles at 1 C at 45° C. | Storage at 60° C. for 30 days | | Discharge efficiency value at 0.3 C at −20° C. |
|---|---|---|---|---|
| | | Capacity retention ratio | Capacity recovery rate | |
| Comparative example 1 | 60% | 60% | 63% | 20% |
| Comparative example 2 | 65% | 63% | 66% | 40% |

As can be seen from the data in Table 3, when the electrolyte contains 0.1%-2% compound 1 represented by the structural formula 1 and less than 0.5% tripropargyl phosphate, various performances of the battery are good; while when the content of tripropargyl phosphate in the electrolyte is more than 0.5%, various performances of the battery are poor, especially the low-temperature discharge performance.

EXAMPLE 11

As shown in Table 4, except that the positive electrode material $LiNi_{0.5}Co_{0.2}Mn_{0.3}O_2$ was replaced with $LiNi_{1/3}Co_{1/3}Mn_{1/3}O_2$, 0.1% compound 1 was replaced with 1% compound 2 in the preparation of an electrolyte, and 0.005% tripropargyl phosphate was replaced with 0.01% tripropargyl phosphate, other conditions were identical to those in example 1, and the measured high-temperature cycle performance, high-temperature storage performance and low-temperature performance data were shown in Table 5.

EXAMPLE 12

As shown in Table 4, the positive electrode material $LiNi_{0.5}Co_{0.2}Mn_{0.3}O_2$ was replaced with $LiCoO_2$, 0.1% compound 1 was replaced with 1% compound 2 in the preparation of an electrolyte, and 0.005% tripropargyl phosphate was replaced with 0.01% tripropargyl phosphate, other conditions were identical to those in example 1, and the measured high-temperature cycle performance, high-temperature storage performance and low-temperature performance data were shown in Table 5.

COMPARATIVE EXAMPLE 3

As shown in Table 4, except that the positive electrode material $LiNi_{0.5}Co_{0.2}Mn_{0.3}O_2$ was replaced with $LiNi_{1/3}Co_{1/3}Mn_{1/3}O_2$, other conditions were identical to those in reference example 2, and the measured high-temperature cycle performance, high-temperature storage performance and low-temperature performance data were shown in Table 5.

COMPARATIVE EXAMPLE 4

As shown in Table 4, except that the positive electrode material $LiNi_{0.5}Co_{0.2}Mn_{0.3}O_2$ was replaced with $LiCoO_2$, other conditions were identical to those in reference example 2, and the measured high-temperature cycle performance, high-temperature storage performance and low-temperature performance data were shown in Table 5.

TABLE 4

| Example | Positive electrode material | Compound represented by the structural formula 1 | Tripropargyl phosphate |
|---|---|---|---|
| Example 11 | $LiNi_{1/3}Co_{1/3}Mn_{1/3}O_2$ | Compound 2 1% | 0.01% |
| Example 12 | $LiCoO_2$ | Compound 2 1% | 0.01% |
| Comparative example 3 | $LiNi_{1/3}Co_{1/3}Mn_{1/3}O_2$ | Compound 2 1% | 0.55% |
| Example 4 | $LiCoO_2$ | Compound 2 1% | 0.55% |

TABLE 5

| Example | Capacity retention ratio after 300 cycles at 1 C at 45° C. | Storage at 60° C. for 30 days | | Discharge efficiency value at 0.3 C at −20° C. |
|---|---|---|---|---|
| | | Capacity retention ratio | Capacity recovery rate | |
| Example 11 | 83% | 82% | 86% | 73% |
| Example 12 | 85% | 84% | 88% | 75% |
| Comparative example 3 | 60% | 60% | 63% | 45% |
| Comparative example 4 | 65% | 64% | 68% | 50% |

As can be seen from the data in Table 5, when the electrolyte contains 0.1%-2% compound represented by the structural formula 1 and less than 0.5% tripropargyl phosphate, various performances of the lithium ion battery with $LiNi_{1/3}Co_{1/3}Mn_{1/3}O_2$ or $LiCoO_2$ as the positive electrode material are good; while when the content of tripropargyl phosphate in the electrolyte is more than 0.5%, various performances of the battery are poor, especially the low-temperature discharge performance.

While the present invention has been further described in detail in conjunction with the specific embodiments set forth above, it shall not be considered that the specific embodiments of the present invention are only limited to these descriptions. For ordinary persons skilled in the art, several simple alternatives or substitutions may also be made without departing from the concept of the present invention, and shall be regarded as falling within the scope of protection of the present invention.

What is claimed is:

1. A lithium ion battery non-aqueous electrolyte, comprising a non-aqueous organic solvent, a lithium salt and an additive, wherein the additive comprises a compound represented by the structural formula 1 and a compound represented by the structural formula 2, in which R is an alkyl selected from an alkyl group having 1 to 4 carbon atoms, formula 1

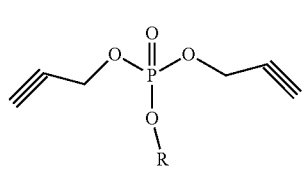

formula 2

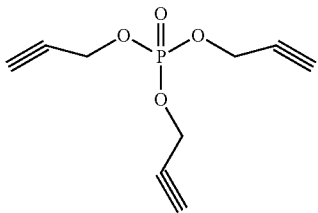

a ratio of the content of the compound represented by the structural formula 1 to a total mass of the lithium ion battery non-aqueous electrolyte is 0.1% to 2%, and a ratio of the content of the compound represented by the structural formula 2 to a total mass of the lithium ion battery non-aqueous electrolyte is less than 0.5%.

2. The lithium ion battery non-aqueous electrolyte according to claim 1, wherein R is selected from the group consisting of a methyl group, an ethyl group, a propyl group, an isopropyl group, a butyl group, an isobutyl group, a sec-butyl group and a tert-butyl group.

3. The lithium ion battery non-aqueous electrolyte according to claim 1, wherein the non-aqueous organic solvent is a mixture of a cyclic carbonate of one or more than two selected from ethylene carbonate, propylene carbonate and butylene carbonate and an acyclic carbonate of one or more than two selected from dimethyl carbonate, diethyl carbonate, ethyl methyl carbonate and methyl propyl carbonate.

4. The lithium ion battery non-aqueous electrolyte according to claim 1, wherein the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

5. The lithium ion battery non-aqueous electrolyte according to claim 1, wherein the additive further comprises one or more than two of vinylene carbonate, fluoroethylene carbonate and vinyl ethylene carbonate.

6. A lithium ion battery, comprising a positive electrode, a negative electrode and a diaphragm between the positive electrode and the negative electrode, and further comprising the lithium ion battery non-aqueous electrolyte according to claim 1.

7. The lithium ion battery according to claim 6, wherein the positive electrode is one or more than two selected from $LiCoO_2$, $LiNiO_2$, $LiMn_2O_4$, $LiCo_{1-y}M_yO_2$, $LiNi_{1-y}M_yO_2$, $LiMn_{2-y}M_yO_4$ and $LiNi_xCo_yMn_zM_{1-x-y-z}O_2$, M is one or more than two selected from Fe, Co, Ni, Mn, Mg, Cu, Zn, Al, Sn, B, Ga, Cr, Sr, V and Ti, and $0 \leq y \leq 1$, $0 \leq x \leq 1$, $0 \leq z \leq 1$, $x+y+z \leq 1$.

8. The lithium ion battery according to claim 6, wherein a charge cut-off voltage of the lithium ion battery is more than or equal to 4.35 V.

9. The lithium ion battery according to claim 7, wherein a charge cut-off voltage of the lithium ion battery is more than or equal to 4.35 V.

* * * * *